United States Patent
El Emam et al.

(10) Patent No.: US 9,503,432 B2
(45) Date of Patent: Nov. 22, 2016

(54) SECURE LINKAGE OF DATABASES

(71) Applicant: Privacy Analytics Inc., Ottawa (CA)

(72) Inventors: Khaled El Emam, Ottawa (CA); Aleksander Essex, London (CA); Ben Eze, Orleans (CA); Matthew Tucciarone, Orleans (CA)

(73) Assignee: PRIVACY ANALYTICS INC., Ottawa (CA)

( * ) Notice: Subject to any disclaimer, the term of this patent is extended or adjusted under 35 U.S.C. 154(b) by 0 days.

(21) Appl. No.: 14/677,892

(22) Filed: Apr. 2, 2015

(65) Prior Publication Data

US 2015/0288665 A1   Oct. 8, 2015

Related U.S. Application Data

(60) Provisional application No. 61/975,326, filed on Apr. 4, 2014.

(51) Int. Cl.
*H04L 29/06* (2006.01)
*G06F 17/30* (2006.01)

(52) U.S. Cl.
CPC ..... *H04L 63/0435* (2013.01); *G06F 17/30589* (2013.01); *G06F 17/30917* (2013.01); *G06F 17/30949* (2013.01); *H04L 63/0442* (2013.01); *H04L 63/06* (2013.01); *H04L 63/061* (2013.01)

(58) Field of Classification Search
CPC . H04L 63/0435; H04L 29/06; H04L 63/061; H04L 63/0442; H04L 63/06; G06F 17/30; G06F 17/30589; G06F 17/30949; G06F 17/30917

See application file for complete search history.

(56) References Cited

U.S. PATENT DOCUMENTS

| | | | |
|---|---|---|---|
| 7,320,069 B1* | 1/2008 | Sundharraj | G06F 21/10 348/E7.056 |
| 8,478,799 B2* | 7/2013 | Beaverson | G06F 17/30097 707/823 |
| 2013/0148868 A1* | 6/2013 | Troncoso Pastoriza | G06K 9/00288 382/118 |
| 2013/0238646 A1* | 9/2013 | Maro | G06F 21/6227 707/758 |
| 2013/0275752 A1* | 10/2013 | Zhang | H04L 9/008 713/167 |
| 2015/0149763 A1* | 5/2015 | Kamara | H04L 9/083 713/150 |
| 2015/0278549 A1* | 10/2015 | Kolesnikov | G06F 21/6254 713/193 |

OTHER PUBLICATIONS

Jurik, Mads J. Extensions to the paillier cryptosystem with applications to cryptological protocols. BRICS, 2003.*
Devroye, Luc, and Pat Morin. "Cuckoo hashing: further analysis."Information Processing Letters 86.4 (2003): 215-219.*

* cited by examiner

*Primary Examiner* — Chau Le
*Assistant Examiner* — Muhammad Chaudhry
(74) *Attorney, Agent, or Firm* — Maldjian Law Group LLC

(57) ABSTRACT

A secure linkage between databases allows records of an individual in a first database to be linked to records of the same individual in a second database without disclosing or providing personal information outside of either database or system responsible for controlling access to the respective databases. As such, records of individuals may be securely linked together without compromising privacy or security of the databases.

16 Claims, 5 Drawing Sheets

SECURE LINKAGE OF DATABASES

CROSS REFERENCE TO RELATED APPLICATION

This application claims priority from U.S. Patent Application No. 61/975,326 filed Apr. 4, 2014 the entirety of which is incorporated by reference for all purposes.

TECHNICAL FIELD

The present disclosure relates to sharing of datasets and in particular to securely linking datasets with potentially sensitive privacy information.

BACKGROUND

There are many situations where it is necessary to gather knowledge of whether certain records exist between two data sets. While it is simple to take the intersection between two data sets, doing so in a secure space is not. Datasets containing information such a financial or medical records can be used for various reasons including research or academic purposes, however the identity of personal information in the datasets must remain protected.

Accordingly, systems and methods that enable secure linkage of databases remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
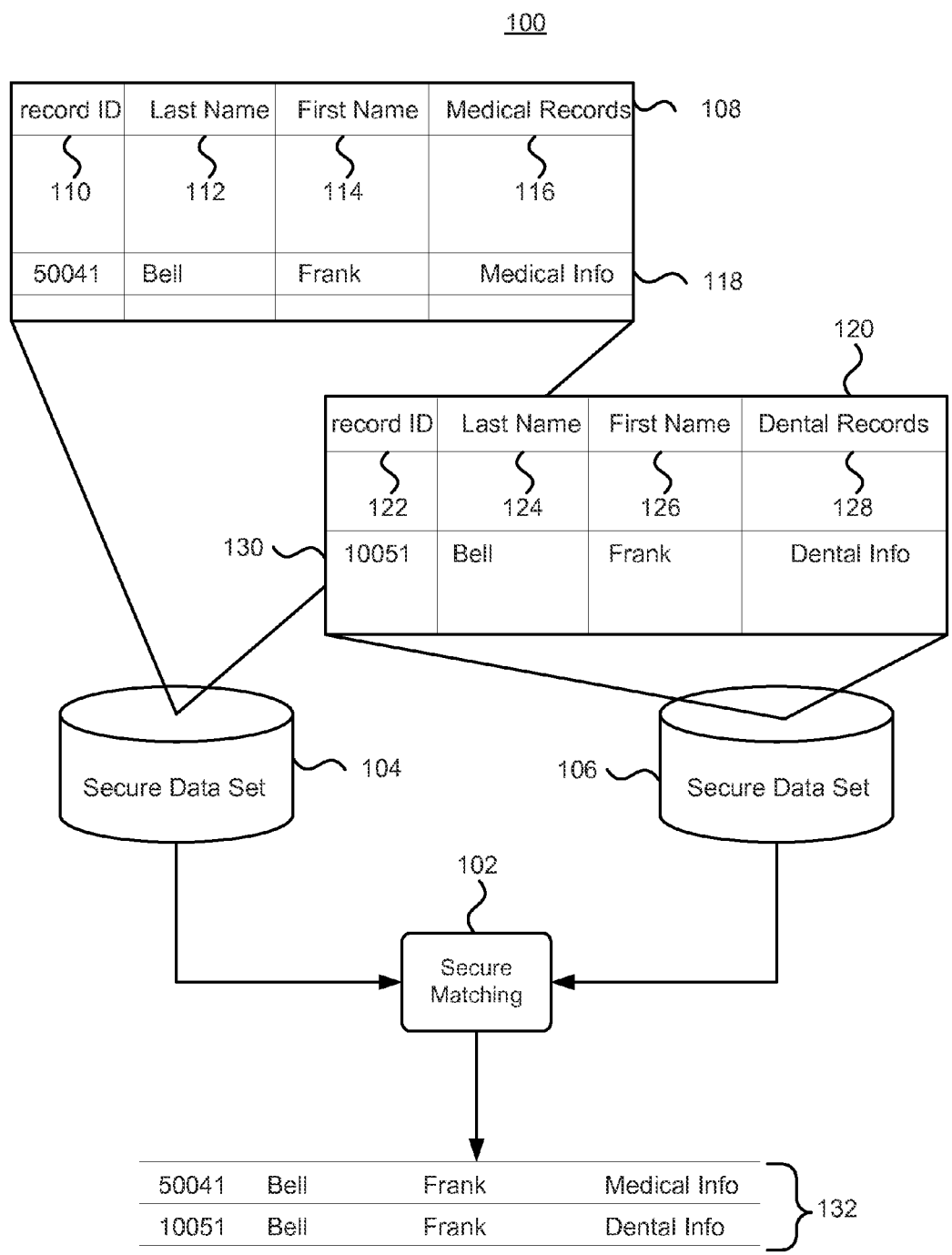
FIG. 1 shows a representation of secure linkage between databases.

In accordance with the present disclosure there is provided method for use in secure linkage of databases, the method comprising: receiving a public encryption key generated by a key holder in conjunction with a corresponding private key; receiving an encrypted dataset of one or more fields of one or more records from a first data store, the encrypted dataset encrypted with the public encryption key generated by the key holder; generating encrypted comparison results between records of the received encrypted dataset and encrypted versions of one or more matching fields of records retrieved from a second data store, the encrypted versions encrypted using the public key; and sending the encrypted comparison results to the key holder of the private key corresponding to the public key for decryption.

In an embodiment of a further method, the one or more fields of the encrypted dataset correspond to the one or more matching fields.

In an embodiment of a further method, the encrypted dataset and the encrypted versions of the retrieved one or more matching fields are encrypted with a probabilistic encryption technique.

In an embodiment of a further method, the probabilistic encryption technique is an additive homomorphic encryption technique.

In an embodiment of a further method, a Pallier cryptosystem is used.

In an embodiment of a further method, the encrypted dataset of the one or more fields of the one or more records from the first data store are stored as a hash table.

In an embodiment of a further method, the hash table is generated using cuckoo hashing.

In an embodiment of a further method, the encrypted dataset is stored as a plurality of tuples for each record of the encrypted dataset, wherein each tuple is described by $\{ref_i, bucketNo, Cyphertext\}$, where:
$ref_i$ is a reference mapping to a record in the first data store;
bucketNo is a hash bucket number the tuple is stored in; and
Cyphertext is the encrypted one or more fields.

In an embodiment of a further method, the Cyphertext of each tuple is described by $\{E(x_{ik}) | \forall i \in \{1, \ldots, N\}, \forall k \in \{1, \ldots, S\}\}$;

where:
$E(x_{ik})$ is an encrypted version of plain text value $x_{ik}$ from the first data store;
N is a number of records in the encrypted dataset; and
S is a number of matching fields n each record in the encrypted dataset from the first data store.

In an embodiment of a further method, S=1 and the Cyphertext of each tuple is encrypted from concatenated values from a plurality of fields concatenated into the single matching field.

In an embodiment of a further method, the encrypted comparison results are generated according to:

$$c_{ijk} = (E(x_{ik}) \times E(y_{jk})^{-1})^{r_j};$$

where:
$E(x_{ik})$ is an encrypted version of plain text value $x_{ik}$ from the first data store;
$E(y_{jk})$ is an encrypted version of plain text value $y_{jk}$ from the second data store;
$r_j$ is a random number; and
$\forall j \in \{1, \ldots, M\}$.

In an embodiment of a further method, the sending the encrypted comparison results comprises sending a plurality of tuples of $\{ref_i, ref_j, c_{ijk}\}$, where:
$ref_j$ is a number mapped to a particular record identifier by the second data store.

In an embodiment of a further method, a record in the first data store mapped to $ref_i$ is linked to a record in the second data store mapped to $ref_j$ if the decrypted value of $c_{ijk}$ is 0 for one or more values of k.

In an embodiment of a further method, a record in the first data store mapped to $ref_i$ is linked to a record in the second data store mapped to $ref_j$ if the decrypted value of $c_{ijk}$ is 0 for all values of k.

In a further embodiment, the method may further comprise generating the public key and corresponding private key at the key holder; and distributing the public key for use in encrypting data from the first data store and the second data store.

In a further embodiment, the method may further comprise receiving the public key; determining the one or more fields in the first data store to be encrypted; retrieving and encrypting the one or more fields of the one or more records from the first data store; and transmitting the encrypted dataset.

In a further embodiment, the method may further comprise receiving the encrypted comparison results at the key holder; decrypting the received encrypted comparison results using the private key; and determining linked records between the first and second data store.

In a further embodiment, the method may further comprise processing linked records.

In accordance with the present disclosure there is provided a further method for use in secure linkage of databases, the method comprising: receiving a public encryption key generated by a key holder in conjunction with a corresponding private key; determining one or more fields in a first data store to be encrypted for use in matching records of the first data store to records of a second data store; retrieving and encrypting the one or more fields of the one or more records from the first data store; and transmitting the encrypted dataset to the second data store.

In accordance with the present disclosure there is provided a further method for use in secure linkage of databases, the method comprising: generating a public and private key pair; transmitting the public key to a first data store for use in encrypting records of the first data store to be compared to records of a second data store; receiving from the second data store encrypted comparison results; decrypting the encrypted comparison results; and determining matching records in the first store and the second data store based on the decrypted comparison results.

In accordance with the present disclosure there is provided a device for use in secure linkage of databases, the device comprising: a processing unit for executing instructions; and a memory unit for storing instructions, which when executed configure the device to perform a method for use in secure linkage of databases by: receiving a public encryption key generated by a key holder in conjunction with a corresponding private key; receiving an encrypted dataset of one or more fields of one or more records from a first data store, the encrypted dataset encrypted with the public encryption key generated by the key holder; generating encrypted comparison results between records of the received encrypted dataset and encrypted versions of one or more matching fields of records retrieved from a second data store, the encrypted versions encrypted using the public key; and sending the encrypted comparison results to the key holder of the private key corresponding to the public key for decryption.

In an embodiment of a further device, the one or more fields of the encrypted dataset correspond to the one or more matching fields.

In an embodiment of a further device, the encrypted dataset and the encrypted versions of the retrieved one or more matching fields are encrypted with a probabilistic encryption technique.

In an embodiment of a further device, the probabilistic encryption technique is an additive homomorphic encryption technique.

In an embodiment of a further device, a Pallier cryptosystem is used.

In an embodiment of a further device, the encrypted dataset of the one or more fields of the one or more records from the first data store are stored as a hash table.

In an embodiment of a further device, the hash table is generated using cuckoo hashing.

In an embodiment of a further device, the encrypted dataset is stored as a plurality of tuples for each record of the encrypted dataset, wherein each tuple is described by {$ref_i$, bucketNo, Cyphertext}, where:
$ref_i$ is a reference mapping to a record in the first data store;
bucketNo is a hash bucket number the tuple is stored in; and
Cyphertext is the encrypted one or more fields.

In an embodiment of a further device, the Cyphertext of each tuple is described by $\{E(x_{ik}) | \forall i \in \{1, \ldots, N\}, \forall k \in \{1, \ldots, S\}\}$;

where:
$E(x_{ik})$ is an encrypted version of plain text value $x_{ik}$ from the first data store;
N is a number of records in the encrypted dataset; and
S is a number of matching fields in each record in the encrypted dataset from the first data store.

In an embodiment of a further device, S=1 and the Cyphertext of each tuple is encrypted from concatenated values from a plurality of fields concatenated into the single matching field.

In an embodiment of a further device the encrypted comparison results are generated according to:

$$c_{ijk} = (E(x_{ik}) \times E(y_{jk})^{-1})^{r_j};$$

where:
$E(x_{ik})$ is an encrypted version of plain text value $x_{ik}$ from the first data store;
$E(y_{jk})$ is an encrypted version of plain text value $y_{jk}$ from the second data store;
$r_j$ is a random number; and
$\forall j \in \{1, \ldots, M\}$.

In an embodiment of a further device, sending the encrypted comparison results comprises sending a plurality of tuples of {$ref_i$, $ref_j$, $c_{ijk}$}, where:
$ref_j$ is a number mapped to a particular record identifier by the second data store.

In an embodiment of a further device, a record in the first data store mapped to $ref_i$ is linked to a record in the second data store mapped to $ref_j$ if the decrypted value of $c_{ijk}$ is 0 for one or more values of k.

In an embodiment of a further device, a record in the first data store mapped to $ref_i$ is linked to a record in the second data store mapped to $ref_j$ if the decrypted value of $c_{ijk}$ is 0 for all values of k.

In accordance with the present disclosure there is provided a further device for use in secure linkage of databases, the device comprising: a processing unit for executing instructions; and a memory unit for storing instructions, which when executed configure the device to perform a method for use in secure linkage of databases by: the method comprising: receiving a public encryption key generated by a key holder in conjunction with a corresponding private key; determining one or more fields in a first data store to be encrypted for use in matching records of the first data store to records of a second data store; retrieving and encrypting the one or more fields of the one or more records from the first data store; and transmitting the encrypted dataset to the second data store.

In accordance with the present disclosure there is provided a further device for use in secure linkage of databases, the device comprising: a processing unit for executing instructions; and a memory unit for storing instructions, which when executed configure the device to perform a method for use in secure linkage of databases by: generating a public and private key pair; transmitting the public key to a first data store for use in encrypting records of the first data store to be compared to records of a second data store; receiving from the second data store encrypted comparison results; decrypting the encrypted comparison results; and determining matching records in the first stare and the second data store based on the decrypted comparison results.

In accordance with the present disclosure there is provided a system for secure linkage of databases, the device comprising: a first device comprising: a processing unit for executing instructions; and a memory unit storing instructions for execution by the processing unit, which when executed configure the device to provide a method comprising: receiving a public encryption key generated by a key holder in conjunction with a corresponding private key; receiving an encrypted dataset of one or more fields of one or more records from a first data store, the encrypted dataset encrypted with the public encryption key generated by the key holder; generating encrypted comparison results between records of the received encrypted dataset and encrypted versions of one or more matching fields of records retrieved from a second data store, the encrypted versions encrypted using the public key; and sending the encrypted comparison results to the key holder of the private key corresponding to the public key for decryption; a key holder device comprising: a processing unit for executing instructions; and a memory unit storing instructions for execution by the processing unit, which when executed configure the device to provide a method comprising: generating a public and private key pair; transmitting the public key to a first data store for use in encrypting records of the first data store to be compared to records of a second data store; receiving from the second data store encrypted comparison results; decrypting the encrypted comparison results; and determining matching records in the first store and the second data store based on the decrypted comparison results; and a second device comprising: a processing unit for executing instructions; and a memory unit storing instructions for execution by the processing unit, which when executed configure the device to provide a method comprising: receiving a public encryption key generated by a key holder in conjunction with a corresponding private key; determining one or more fields in a first data store to be encrypted for use in matching records of the first data store to records of a second data store; retrieving and encrypting the one or more fields of the one or more records from the first data store; and transmitting the encrypted dataset to the second data store.

In accordance with the present disclosure there is provided a non-transitory computer readable medium storing program instructions for causing a computer to perform a method according to any of the methods described herein.

Databases are used to store a wide variety of data, including information about a user such as medical information, financial information and other possible information. Depending upon the type of personal information stored in a particular database, the use of the stored information may be controlled by one or more privacy regulations. The privacy regulations controlling the use and/or dissemination of stored data may be defined by an organization that owns the data, one or more external organizations defining privacy policies and/or governmental agencies defining privacy policies. A particular individual may have information stored in multiple different databases controlled by different entities. It may be desirable to be able to link the individual's information stored across the different databases in a secure manner that does not require divulging information about the individual outside of the entity responsible for the respective databases. Once the links of the individual's records in the different database are determined, the information about the linked records may be used in various ways. For example, information from the linked records may be used for academic or research purposes or providing additional functionality.

As described further below, it is possible to securely determine linkages between databases in such a manner that information from the respective databases are not divulged outside of the database entities. Information from the first database to be used in linking records may be encrypted with a public key. The encrypted information may then be compared to encrypted information from the second database that was encrypted with the same public key to generate encrypted comparison results. The encrypted comparison results may then be decrypted to determine matching, or linked, records between the first and second databases. The matching information may then be provided to the respective databases, or used in other manners. Accordingly, it is possible to determine matching records between two databases without divulging information from the databases, unless it is encrypted. Further the encrypted information does not need to be transmitted to the entity that has access to the decryption key and as such, the personal information stored in the different databases may remain secure and in compliance with privacy or use policies.

The secure linkage of databases is described below, by way of example only, with reference to FIG. 1-6. The linking system and method described herein allows the secure intersection of records between two data sets without disclosing any private health information (PHI) such as medical records or personally identifiable information (PII) such as financial records.

It is assumed that there are two parties, A and B each have respective databases that store information on entities, such as individuals. The databases may store health and/or financial records, or other types of information including personally identifiable information. The parties A and B, or an authorized third party, may wish to link data between the databases of parties A and B. That is, for example, party A may wish to know what records stored with party B are associated with particular individuals associated with records stored with party A. The database of party A may have N records and the database of party B may have M records. It is assumed that there are S fields in the respective databases that can be used for matching. For example, the fields of "first name", "last name", "date of birth" and "postal code" may be used to uniquely identify records in each database that are associated with the same individual and as such should be linked. Additionally or alternatively, the linking fields may be a social security number of social insurance number, date of birth, as well as other information. The particular fields are not of particular importance as long as corresponding fields are present in both databases and that a combination of the values of the fields can uniquely identify records of an individual or entity. The shared fields of each database used for matching may be denoted as $V_k$ where $k \in \{1, \ldots, S\}$. The values of the matching fields in the databases may be indexed as $x_{ik}$ and $y_{jk}$ for the databases of parties A and B respectively where $i \in \{1, \ldots, N\}$, and $j \in \{1, \ldots M\}$. As described further herein, a third party may determine matches between records of the two databases without performing plaintext comparisons of the database information.

The secure linkage technique described herein provides reasonable performance even if either or both parties A and B do not have significant computing power such as computing clusters or specialized computing resources. Further, the technique does not require the use of a trusted third party. A trusted third party would have access to the private information in the databases of both parties being linked and would need to have strong physical, logical, and governance protections in place in order to comply with the privacy policies of both parties. In practice, both parties need to trust such a party, which can be challenging if the parties are in different jurisdictions. In the linkage technique described herein, third parties maybe semi-trusted, which means that the third parties will faithfully follow the described protocol, but may try to discover the personal information from the information that it handles. Further, the linkage technique described herein does not require any of the parties to share secrets. Sharing secrets implies that one party must trust the other one. For example, if party A were to lose a shared key that is shared with party B then that would jeopardize any party B data that is encrypted or hashed using the lost key. The matching fields or variables, $V_k$, may comprise unique identifiers, names, and dates, and the described linkage technique may handle these different data types.

The architecture of the linking protocol requires a semi-trusted third party, described further herein as the key holder. The key holder should not be able to learn the identity of the patients or learn new information that they did not previously possess about them during the process of linking. The only information obtained by the key holder in the linkage process is the number of records that are matched between the two databases, as well as identifiers that each respective database may associate with particular records, however outside of the particular database provider, the identifiers may be simply random numbers.

FIG. 1 shows a representation of secure linkage between databases. As depicted in FIG. 1 the secure linking functionality 102 can process records from two secure data sets 104, 106. The secure data sets are considered to be different database each containing personal information about users, such as health, medical and/or financial records. Although described herein as being related to personal information, it is contemplated that the linkage technique may be applied to other datasets. As depicted, the first secure data set 104 comprises one or more tables 108 storing a plurality of records with each having values of a number of fields. The fields may include, for example, a record ID field 110, a last name field 112, a first name field 114 and a medical records field 116. It will be appreciated that the table 108 and the particular fields are only illustrative and numerous different tables and fields are possible.

The second secure data set 106 may include a number of tables 120 storing similar information such as a record ID field 122, a last name field 124, a first name field 126 and a dental record field 128. As depicted, both the first secure data set 104 and the second secure data set store information on the same individual, namely Frank Bell. It will be appreciated that in the example of FIG. 1 it is assumed that a first name and last name are sufficient to uniquely identify the user and so link the records. However, in practice additional fields may be required to uniquely identify users. In addition to the fields used to match records, which are the last name fields 112, 124 and the first name fields 114, 126, the secure datasets 104, 106 store additional information associated with the user, such as a record IDs, medical and dental records. Again, the additional information depicted in FIG. 1 is intended only to be illustrative in nature and the actual data stored and its particular database schema may vary substantially from that depicted in FIG. 1, As depicted, the record or records associated with the same user in the two databases, depicted as records 118 and 130, may be linked together 132 by the secure linking functionality 102 without divulging information from the secure data sets 104, 106 to third parties. The linkage between the records may be protected such that only the two databases or parties can fully link the two records together. As an example, party A may associate the record ID '50041' with a random number '183018' and party associate the record ID '10051' with another random number '482900 '. The result of the secure linking may indicate the linkage of the records two the two databases by indicating a linkage between the two random numbers. That is, the secure linking process results in an indication that the record in A associated with the random number '183018' is linked to the record in B associated with the random number '482900'. Since only A and B respectively know what record is associated with particular random numbers, minimal information is leaked through the process, namely only the number of linked records between the two databases.

Figure 2:
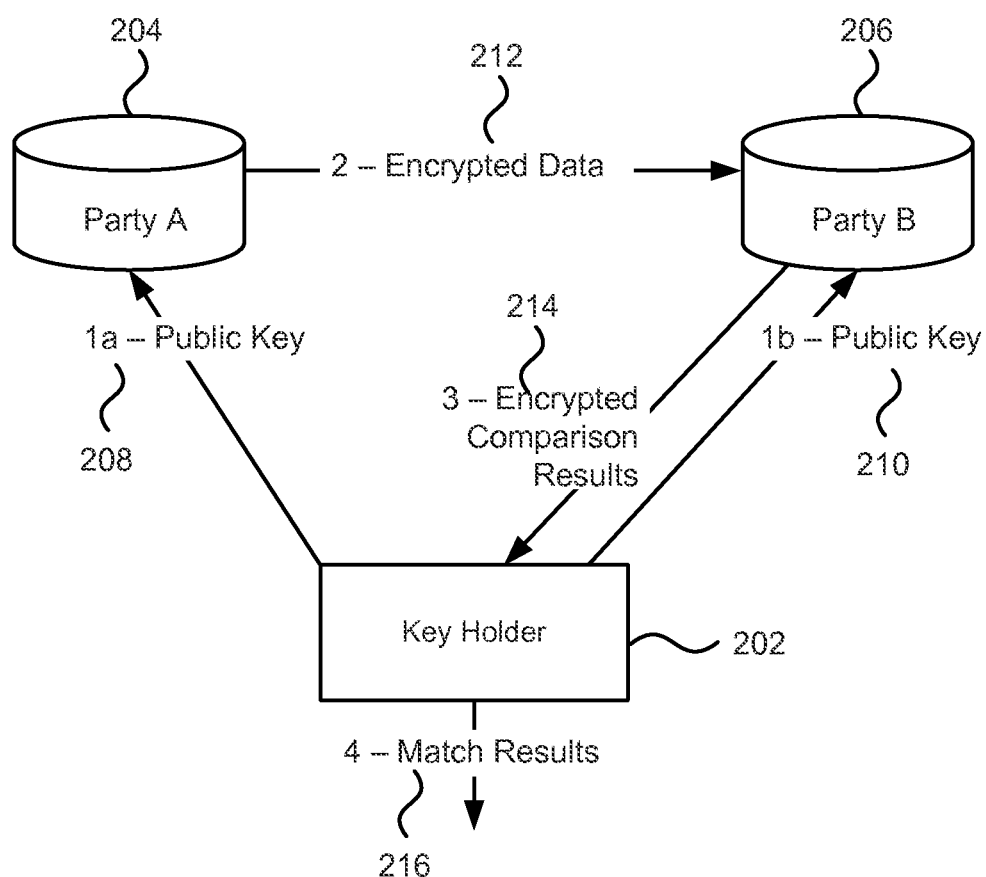
FIG. 2 shows a representation of a process for secure linkage between databases.

FIG. 2 shows a representation of a process for secure linkage between databases. As depicted, there are three main parties involved in the secure linking. The parties depicted in FIG. 2 may be provided by respective computing systems, provided by one or more computers. For example, the key holder party 202 may be provided by functionality running on a computer or server, party A 204 may be associated with a database provided by a first entity, namely party A or requester, and party B 206 may be associated with a database provided by a second entity, namely party B 206 or proprietor. As described in further detail below, the key holder 202 generates a public/private key pair and distributes the public key to both parties, depicted by arrows 208, 210. Although depicted as being distributed to both parties from the key holder 202, it is possible to distribute the public key to the first party, party A 204, which in turn distributes the public key to the second party, party B 206. The party A 204 determines and retrieves the record information that is to be matched, encrypts the data using the public key and transmits the encrypted data to party B 206, as depicted by line 212. The transmission may be done in various ways including, for example transmitting encrypted database files using secure file transfer protocol or other transfer techniques. The party B 206 receives the encrypted data and compares the encrypted data to correspondingly encrypted data from party B's 206 database. The result of the comparison of the encrypted data provides encrypted comparison results that are transmitted to the key holder, as depicted by arrow 214. The key holder 202 receives the encrypted comparison results and decrypts the encrypted results. Based on the decrypted results, records from Party A's 204 database that match records in Party B's 206 database are identified. The match results may be provided and processed in various ways, represented generally by arrow 216.

Party A 204 may be considered as a requester that sends information to party B 206 for requesting an identification of matching records. Party B 206 may be considered as a proprietor of a database of personal information. The key holder may be a third party entity that is semi-trusted by the other parties, such as the requester and proprietor. As described above, the key holder 202 generates a public and private key pair and sends the public key to the requester (Party A) 204. The requester 204 uses the public key to generate and encrypt their source data set that is used for determining matching records. The requester 204 may encrypt all records in the secure data set, in which case all records in the first data set will be matched, or attempted to be matched with records from the proprietor's data set. Alternatively, the requester may encrypt a subset of the possible records, including for example only a single record, for matching. The requester 204 sends the encrypted data, along with the public key used in the encryption, if not already distributed, to Proprietor. The requester 204 may include information indicative of the fields to be used in matching records. Alternatively, the matching field's information may be communicated with the two parties' out-of-band such as during a configuration process. The proprietor 206 (Party B) generates an encrypted data set from the matching fields of their own data set using the public key and runs a comparison against the encrypted data received from the requester 204. The proprietor 206 sends the encrypted comparison results, along with meta data indicative of which records in the respective databases the encrypted comparison result applies to, to the key holder. The key holder 202 decrypts the encrypted comparison data using the private key to generate a resulting match set in conjunction with the meta data. The resulting match set may be processed in various manners. For example the indication of the matching records may be provided to each of the parties which may be used in linking the records for various purposes, including for example the sharing of anonymized user information.

The key holder 202 comprises key generation functionality and possibly management functionality. The key holder may link records between multiple different databases, with the linkage of two databases requiring their own public/private keys. Accordingly, the system may provide key management functionality for tracking keys being created by the key holder. The key holder may operate with multiple different parties that are linking different databases which requires different public\private keys for their data. A key management interface may allow the creation of named keys. Each key generated may have a name according to a predefined naming convention. For example if a particular linking between two databases being handled by the key holder is named "ProjectA," the keys could be named "ProjectA_public.Public" for the public key and "ProjectA_private.Private" for the privacy key. The key generation may be done as a separate operation and the generated keys stored as an XML document that contains the linking system tool version number, an element for the public key and another for the private key. Depending on the encryption key export option, either of the public or private key sections may be empty.

A data encryption module encrypts a dataset, thus preparing it to be used for secure comparison with another encrypted dataset. The encryption may be done by a first party, such as a requester, that determines the records to be matched along with the keys used for linking related records across the databases. For each record, the values associated with one or more fields used for matching may be encrypted. The values of the fields may be individually encrypted, or if multiple fields are used to uniquely identify an individual, for example first name and last name, the fields may be concatenated and the concatenated values encrypted. Encrypted data may be stored in a database or database file along with metadata. A random number may be associated each encrypted record, or rather the encrypted field or fields of a record. The requester may store a mapping between the random number and the associated record, which limits the information that is leaked from the database. The output of the data encryption process may be a database file such as a SQLite database file. To run the encryption, an indication of the data to be encrypted, namely the records, and fields of the records is provided. The data to be encrypted may be stored in a plain text table in a database of the requester party, or the data may be encrypted in a manner that it can be decrypted to plain text by the requester prior to the encryption for linking. An indication of the unique identifiers of the records, such as the random numbers linked to records described above, along with the particular fields used for matching, along with the fields' particular concatenation order if the fields are to be concatenated prior to encryption, may also be provided. The public key may also provided along with an indication of the output database file, which may use the .Encrypted extension. It will be appreciated, that the encryption results may be stored in other formats than a database file.

As described in further detail below, when linking all or a large number of records in a database the encryption process may store the encryption results in a balanced hash table in order to speed up the subsequent comparison process. The fields in the hash table may be ReferenceID, BucketNo, and Ciphertext. The ReferenceID may be for example the random number associated with a particular record described above, the Ciphertext may be the particular record's encrypted matching field or fields and the BucketNo may be the bucket number the element is stored at in the hash table. The dataset to be encrypted should have unique match fields in order to successfully create a balanced hash table. The final match result dataset, after comparisons are done, will come back with the ReferenceID for matched results, which may be used in a reverse lookup to identify the actual record IDs of the matched records.

The encrypted output database may contain the balanced hash table as well as the meta data, such as the version of linking system; the public key used in the encryption; the size of the dataset; and the two random values used in generating the hash buckets.

Once the first dataset, or a subset of the first dataset to be compared, is encrypted, it is transmitted to the second party and used in determining an encrypted comparison result set. The transmission may be done in a number of ways depending upon the size of the encrypted file and communication connections available between the first and second parties. For example, the encrypted dataset may be provided to the second party using secure FTP. The comparison compares records from the second dataset, which may be stored in plaintext format, and the encrypted records, or rather the encrypted field or fields used for matching of the records received from the first party. The comparison may include encrypting the plaintext dataset of the second dataset, or portion thereof using the public encryption key. The output of this comparison process may be a database file, or other suitable structure, containing the encrypted comparison results along with associated metadata.

The input parameters to the secure comparison process may include, the plaintext dataset the encrypted records is to be compared to, the unique IDs of the records being compared and the match fields and concatenation order if the field values are concatenated prior to encrypting, the encrypted data being compared, such as the encrypted database file described above, and an output location for the encrypted comparison results dataset, which may be stored as a .Compare SQLite database file.

The encrypted comparison results dataset may store a tuple for the match results for each record comparison. Each tuple may be, for example, {Keys, ReferenceID, MatchResults}, where Keys represent the record from the second dataset being compared, ReferenceID represents the reference ID, as described above, for the record from the first data set being compared, and the MatchResults provides the encrypted comparison result. When decrypted, the MatchResult provides an indication of whether the record in the second dataset identified by Keys matches the record in the first dataset identified by ReferenceID.

Once the encrypted comparison results are determined, the encrypted comparison results may be decrypted using the private key held by the key holder in order to produce the match results data set. The decrypted match results may be stored in a database file or other structure and may use a .Matches file. The match results may then be sent back to either the first requester party that encrypted data or the second proprietor party that did the comparison with another dataset. If the former need the match results, a reverse lookup is made on the ReferenceIDs to get the actual keys that are in the original plain text dataset.

The encryption and secure comparison described above may use an additive homomorphic encryption technique. The additive homomorphic encryption technique used may be for example as proposed by P. Paillier, "Public-key cryptosystems based on composite degree residuosity classes," in *Proceedings of the 17th international conference on Theory and application of cryptographic techniques*, Berlin, Heidelberg, 1999, pp. 223-238, the contents of which is hereby incorporated by reference in its entirety. With the Paillier cryptosystem it is possible to perform mathematical operations on the encrypted values themselves, such as addition and limited forms of multiplication. Formally, for any two data elements $m_1$ and $m_2$, their encrypted values, $E(m_1)$ and $E(m_2)$, the following equation is satisfied:

$$D(E(m_1) \times E(m_2) \bmod p^2) = m_1 + m_2 \bmod p \qquad (1)$$

where p is a product of two large prime numbers, and D is the decryption function. In this type of cryptosystem addition of the plaintext is mapped to the multiplication of the corresponding ciphertext. The Paillier cryptosystem also allows a limited form of the product of an encrypted value:

$$D(E(m_1)^{m_1} \bmod p^2) = m_1 \times m_2 \bmod p \qquad (2)$$

which allows an encrypted value to be multiplied with a plaintext value to obtain their product.

Another property of Paillier encryption is that it is probabilistic. This means that it uses randomness in its encryption algorithm so that when encrypting the same message different times it will, in general, yield different ciphertexts. This property may help to ensure that an adversary would not be able to compare an encrypted message to all possible counts from zero onwards and determine what the encrypted value is.

When using the additive homomorphic encryption technique; a key holder generates a public/private key pair and sends the public key to Party A associated with a first dataset to be compared. It is assumed that party A initiates the matching, although it is possible for other parties, such as the key holder or party B to initiate the matching. For the secure comparison of non-string matching fields Party A sends the data set $\{E(x_{ik}) | \forall i \in \{1, \ldots, N\}, \forall k \in \{1, \ldots, S\}\}$ to Party B. For each record in B's database a random number $r_j$, $\forall j \in \{1, \ldots, M\}$ is generated. Then, for all pairs i, j $c_{ijk} = (E(x_{ik}) \times E(y_{jk})^{-1})^{r_j}$ is computed for every field k, and all tuples of $\{ref_i, ref_j, c_{ijk}\}$ values are sent to the key holder. The key holder uses the previously generated private key to decrypt the $c_{ijk}$ values. If any of these values are equal to zero then the value in the query, that is the record from the first database matches the value in the second database being compared, otherwise it is a non-match. The key holder now has a binary match/non-match value far all of the compared pairs. The key holder may send the reference values $ref_i$, $ref_j$ to party A (or both parties) indicating which record pairs are considered a match, and to which record at party B the match occurred. The reference values may be mapped to record identifiers by the parties, which each may store a generated mapping between the reference values and record IDs.

The above has described the secure comparison of non-string values. However, a similar process may be used to match strings. For example, a commonly used matching field is the last name. The last name is a string field and would have to be considered differently to allow for approximate matching of strings such as misspelled names. It is possible to use phonetic encoding functions, such as Soundex and NYSIIS, and perform exact comparisons as for other non-string fields. This generally tends to be robust in case of spelling mistakes and typographical errors.

Following the date matching guidelines used by the R. Bigard, "National death index matching criteria." U.S. Department of Health and Human Services, the following three matches may be attempted for dates and the dates are considered a match if any of the following exact comparisons are true: (a) exact month and year of birth, (b) exact month and day of birth, and (c) exact month +/−1 year of birth. Therefore, for DoB values that are encrypted and sent are day, month, year −1, year, and year +1. This means that each date is broken into its three components, and the year of birth is incremented and decremented. The final date would be represented by five different encrypted values.

The above described protocol may not scale very well because it requires every record in one table to be matched with every other record in the other table. This is extremely inefficient and would not be practically workable for very large tables. Therefore, a different way to structure the data may be used.

This can be done if party A is able to represent its data in a hash table, and if party B can then do quick lookups in that hash table to find the appropriate value to compare with. Hash tables are a very efficient way to store and retrieve information.

Party A may compute a hash value for every unique identifier (or set of variables that make up a unique identifier). That hash value is chosen to allow for a few collisions—more than one original value will produce the same value. That hash value may be then stored in a table with the encrypted value of the unique identifier.

This hash table is sent to party B. Party B computes the hash value for each unique identifier in its table, and then finds the corresponding bin in the hash table it received from party A. It then only compares to its encrypted value with the values in that bin. This can result in a dramatic reduction in the number of comparisons that need to be performed.

There are a number of schemes that would work for the hashing. A quite efficient one is called cuckoo hashing, which is described below.

Cuckoo Hashing

Inputs: Hash functions $h_1$, $h_2$ chosen independently. A set of i=1 ... n key/value pairs $\langle k_i, v_i \rangle$. Table length l.

Initialize. Initialize an empty table T with αn locations (in Cuckoo hashing, α≥1 with a typical choice for α being in the range 1.5 to 2.

Insert $(k_i, v_i)$. Inserting an element $(k_i, v_i)$ is done as follows:

1. CASE: $(k_i, v_i)$ already exists in T. If either $T(h_1(k_i) \bmod \alpha n)$ or $T(h_2(k_i) \bmod \alpha n)$ equal $v_i$,
   return.

2. CASE: $(k_i, v_i)$'s primary location is empty. If $T(h_1(k_i) \mod \alpha n)$ is empty, insert $(k_i, v_i)$ there, return.
3. CASE: $(k_i, v_i)$'s primary location currently occupied. If $T(h_1(k_i) \mod \alpha n)$ is already occupied by some element, $(k_j, v_j)$, this element is "kicked out," and replaced by $(k_i, v_i)$. The displaced element $(k_j, v_j)$ is then placed in its alternate location as follows:
   a. CASE: displaced element $(k_j, v_j)$ was in it primary location. If $T(h_1(k_i) \mod \alpha n) == T(h_1(k_j) \mod \alpha n)$, Place $(k_j, v_j)$ in its secondary location, $T(h_2(k_j) \mod \alpha n)$.
   b. CASE: displaced element $(k_j, v_j)$ was in its secondary location. If $T(h_1(k_i) \mod \alpha n) == T(h_2(k_j) \mod \alpha n)$ Place $(k_j, v_j)$ in its primary location, $T(h_1(k_j) \mod \alpha n)$.

If placing the displaced element in its alternate position results in displacing another element, this process is successively repeated until moving a displaced element causes no further displacements. If successive displacements result in cycle, halt and rerun the algorithm with new randomly chosen hash functions $h_1', h_2' \in \mathcal{H}$.

Retrieve($k_i$). Retrieving an element is accomplished by searching for it in one of two possible locations: $T(h_1(k_i) \mod \alpha n)$ or $T(h_2(k_i) \mod \alpha n)$.

ElGamal cryptosystems may be used as an implementation of the Pallier encryption described above. In the timing analysis presented below the exponential variant of the ElGamal cryptosystem was used which may provide much faster performance for the equality test. The ElGamal cryptosystem is summarized as follows Key Generation
1. Let $\mathbb{G}_q$ be a multiplicative cyclic group of prime order q. Without loss of generality, let $\mathbb{G}_q$ be a subgroup of $\mathbb{Z}_p$, in which $p = 2\alpha q + 1$ for $\alpha > 1$. NIST minimally recommends $|p| = 1024$ bits and $|q| = 160$ bits, achieving an 80 bit security level. Let g be a generator/primitive element of $\mathbb{G}_q$.
2. The key holder selects a random $x \in_R \mathbb{Z}_q$ and computes $y = g^x \mod p$.

3. The key holder's private key is $\langle x \rangle$ and the public key is $\langle p, q, g, y \rangle$, Encryption.
1. Let $m \in \mathbb{Z}_q$ be the message to be encrypted.
2. The sender selects a random $r \in_R \mathbb{Z}_q$ and computes $\langle c_1, c_2 \rangle = \langle g^r \mod p, g^m y^r \mod p \rangle$.

Decryption.
1. Given $\langle c_1, c_2 \rangle$ the key holder first computes $$m' = g^m = \frac{c_2}{c_1^x} \mod p.$$

2, The key holder then computes $m = \log_g m'$.

This step is equivalent to solving a discrete logarithm, which is a hard problem in general, but is efficient when the message space $|\mathcal{M}|$ is sufficiently small. For the currently described application, this condition is satisfied.

Performance Evaluation

A performance evaluation was performed on a 64 bit Windows™ 7 server machine with an Intel™ Core i5-4200M CPU @ 2.50 GHz and 12 GB of DDR2 RAM was used. The results are depicted in Table 1 below.

TABLE 1

Table of processing times

| #of records | #of Fields | Encryption | Compare | Match | Total |
|---|---|---|---|---|---|
| 1 Million | 2 | 41 min, 10 s | 1 hr, 11 m, 53 s | 16 min, 53 s | 2 hr, 9 min, 56 s |

The compare operation involved only 2× the number of records operations. For example, for the 1 million record data set, only 2 million comparisons were performed. Without the use of the hash table scheme this would have taken 10 trillion comparisons.

Figure 3:
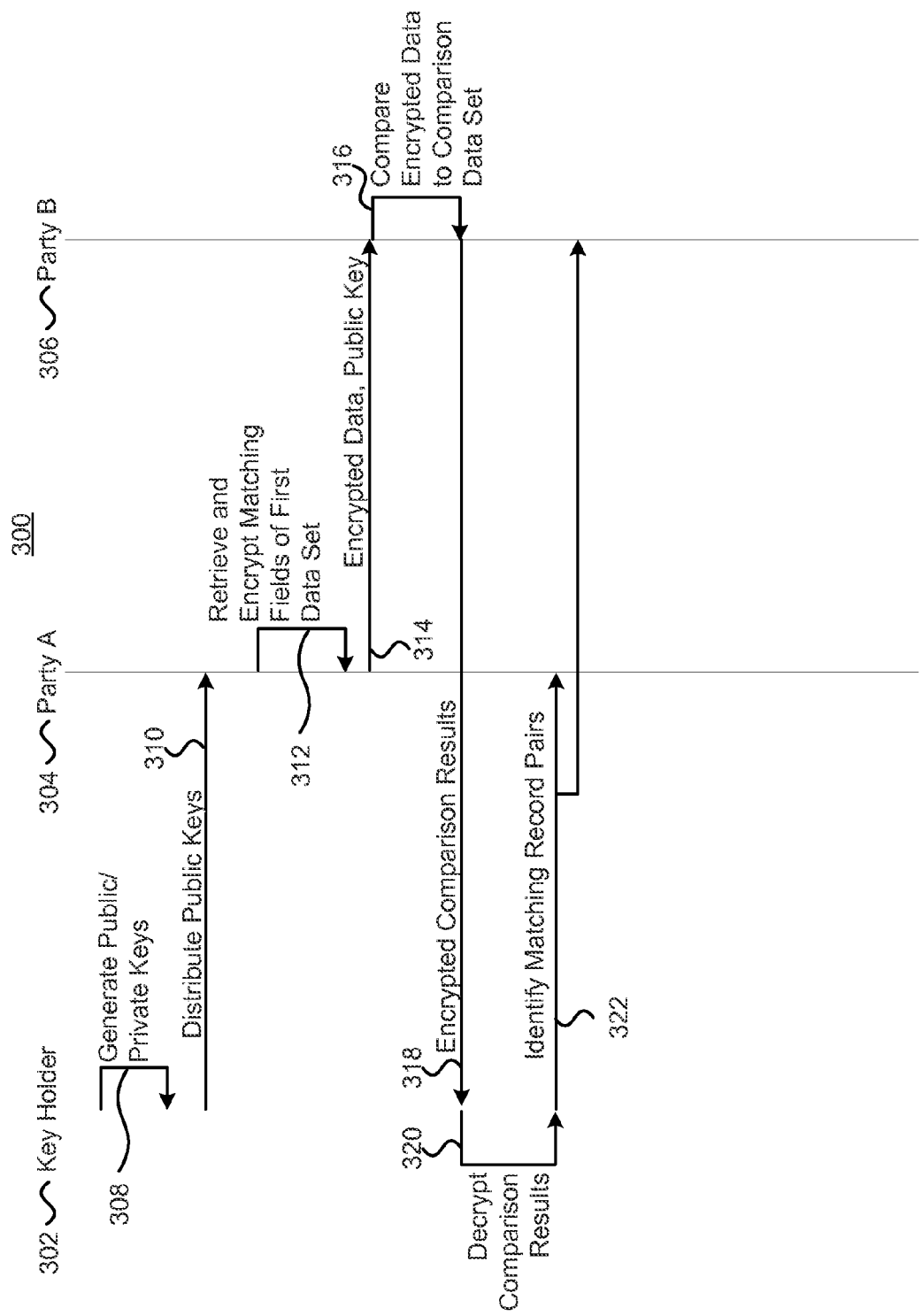
FIG. 3 shows a representation of a further process for secure linkage between databases.

FIG. 3 shows a representation of a further process for secure linkage between databases. The process 300 may begin with the key holder 302 generating a public/private key pair, depicted by arrow 308, and distributing the public key to Party A 304, depicted by arrow 310. Party A receives the public key, and retrieves and encrypts specified matching field of the records from a first data set, depicted by arrow 312. Party A sends the encrypted data and associated meta data along with the public key used to encrypt the data to Party B 306, depicted by arrow 314. Party B receives the encrypted data set and public key and performs a secure comparison between the encrypted data from Party A and a data set at Party B. The secure comparison may compare the encrypted data elements to encrypted data elements from Party B's plain text data elements. Regardless of how the comparison is performed, it is possible for Party B to perform a comparison that provides an encrypted indication of whether or not the two records or elements being compared match each other. The encrypted comparison indication results are sent to the key holder, depicted by arrow 318, where the results are decrypted and matches between elements are determined based on the decrypted result set, depicted by arrow 320. The key holder may send the identification of matching records to one or both parties, depicted by arrow 322. The parties can then provide or exchange the matching records to the other party.

Figure 4:
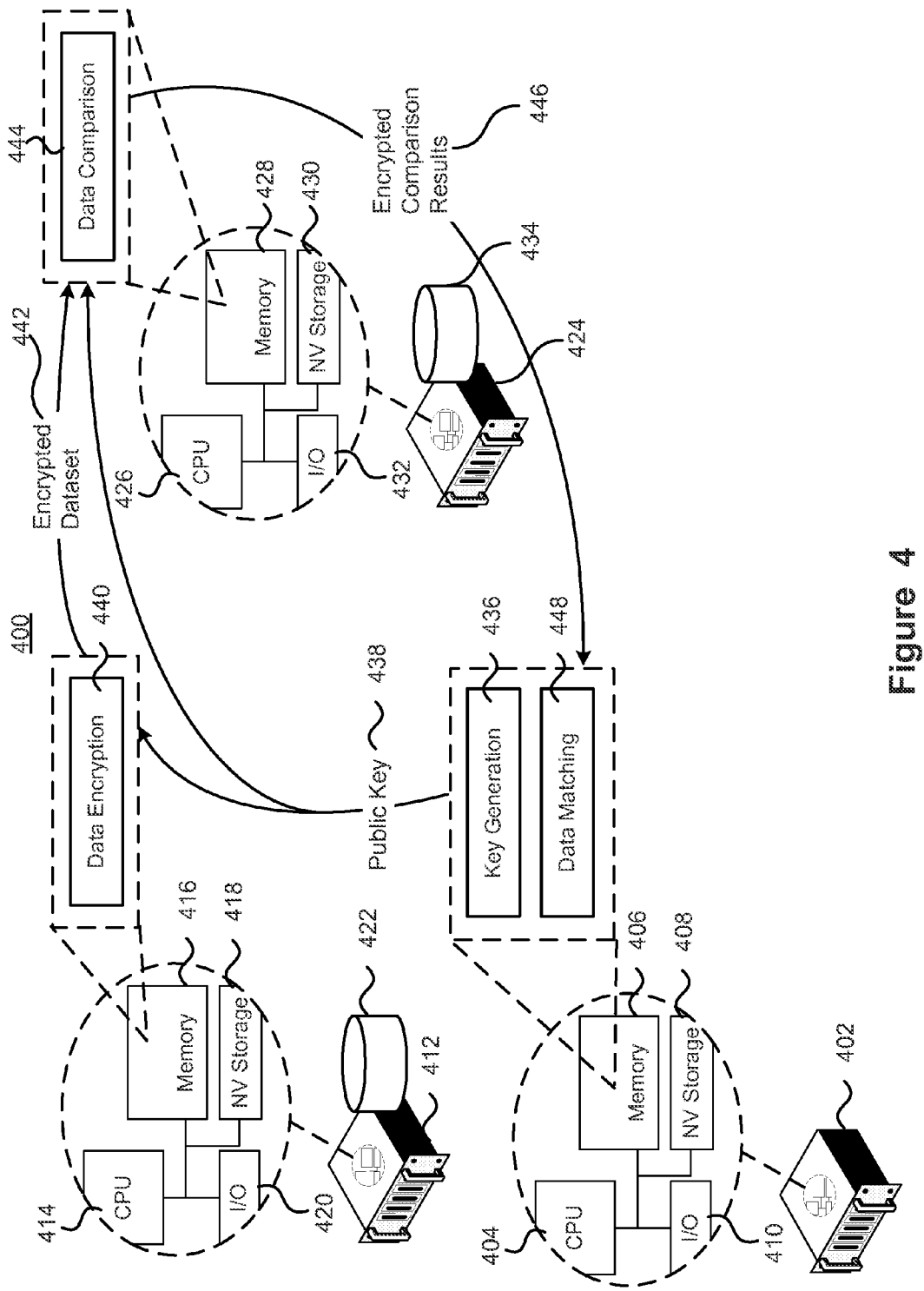
FIG. 4 shows a representation of components of a system for secure linkage between databases.

FIG. 4 shows a representation of components of a system for secure linkage between databases. The system 400 comprises a plurality of computing devices, including a computing system 402 for a key holder, a computing system 412 for a first party and a computing system 424 for a second party. Although not depicted in FIG. 4, the computing systems 402, 412, 424 may be coupled together through a communication network such as the internet. Further, although depicted as single computing systems, it is possible for one or more of the depicted computing systems to be provided by a plurality of cooperating computing devices to provide the depicted functionality in a distributed manner.

The key holder computing system 402 comprises a processing unit 404 which may comprise one or more interconnected processors each with one or more processing cores, for executing instructions. The instructions, along with data may be stored in volatile memory 406 such as local registers or cache memory of the processing unit, random access memory (RAM) or other volatile memory. The instructions and data may be stored in non-volatile storage 408 for storing information through power cycles. The computer system 402 may also include one or more input/output interfaces 410 for inputting and/or outputting data to and from the computing system 402. When executed by the processing unit 404, the instructions stored in the memory unit 406 may configure the computing system 402 to provide various functionality including key generation functionality 436 and data matching functionality 448.

The computing system 412 of the first party comprises a processing unit 414 which may comprise one or more interconnected processors each with one or more processing cores, for executing instructions. The instructions, along with data may be stored in volatile memory 416 such as local registers or cache memory of the processing unit, random access memory (RAM) or other volatile memory. The instructions and data may be stored in non-volatile storage 418 for storing information through power cycles. The computer system 412 may also include one or more input/output interfaces 420 for inputting and/or outputting data to and from the computing system 412. The computing system 412 also provides a data store of information. When executed by the processing unit 414, the instructions stored in the memory unit 416 may configure the computing system 412 to provide various functionality including data encryption functionality 440.

The computing system 424 of the first party comprises a processing unit 426 which may comprise one or more interconnected processors each with one or more processing cores, for executing instructions. The instructions, along with data may be stored in volatile memory 428 such as local registers or cache memory of the processing unit, random access memory (RAM) or other volatile memory. The instructions and data may be stored in non-volatile storage 430 for storing information through power cycles. The computer system 424 may also include one or more input/output interfaces 432 for inputting and/or outputting data to and from the computing system 424. The computing system 42 also provides a data store of information. When executed by the processing unit 426, the instructions stored in the memory unit 428 may configure the computing system 424 to provide various functionality including data comparison functionality 444.

The key generation functionality 436 generates public and private keys, and the public key may be provided to the first party's computing system 412. The public key may also be distributed to the second party's computing system 424 either directly from the key holder or through the first party's computing system. The data encryption functionality 440 uses the public key to encrypt a portion of the data set from the database 422, which is transmitted to the second party's computing system 424. The data comparison functionality 444 receives the encrypted data set and compares the encrypted data to a portion of the database 434 at the second party's computing system 424. The comparison provides an encrypted indication of whether or not compared elements from the two databases 422, 434 match. The encrypted comparison results 446 are returned to the key holder computing device 402, where data matching functionality 448 decrypts the encrypted comparison results using the previously generated private key to generate matching results between the two databases.

Figure 5:
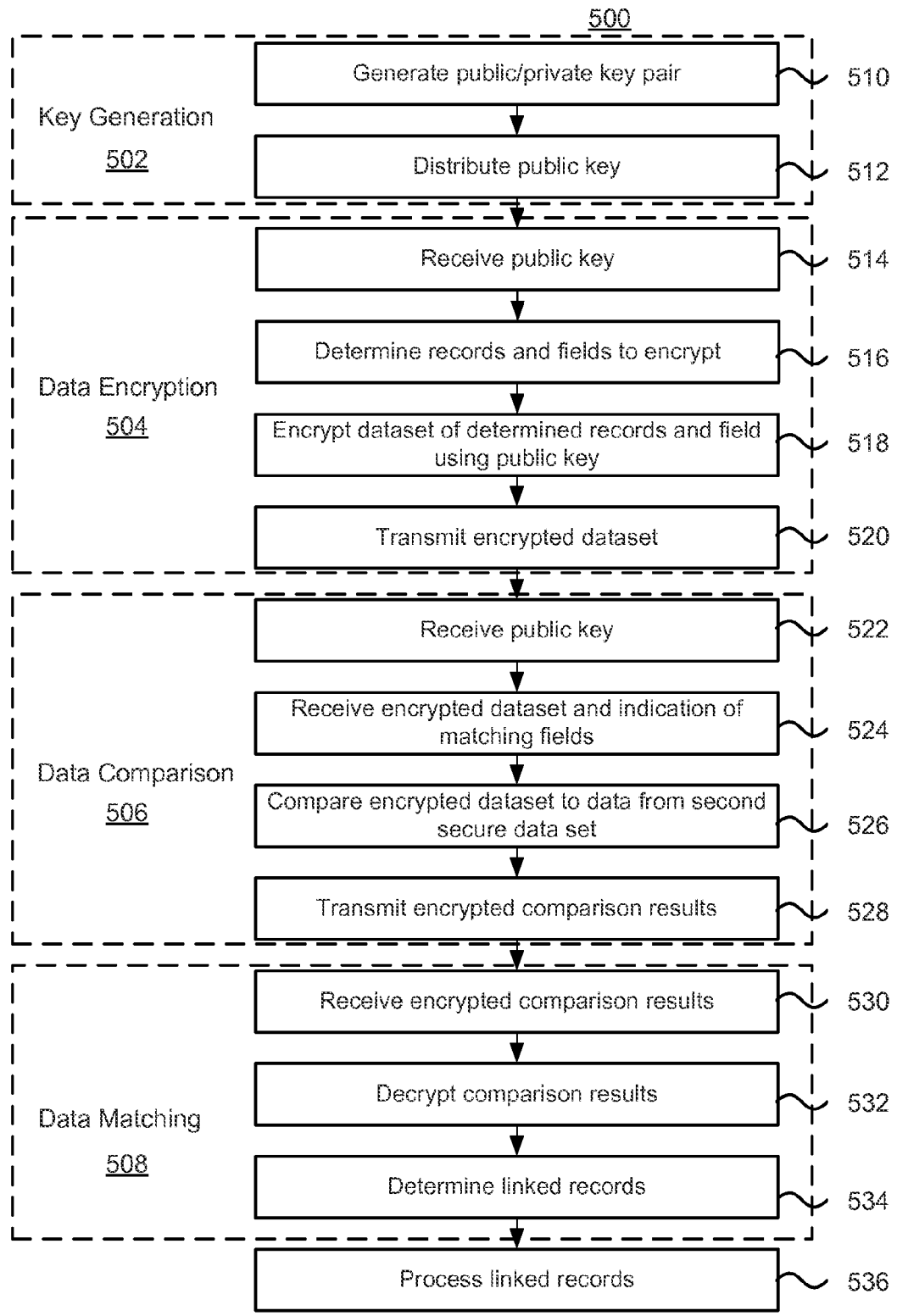
FIG. 5 shows a representation of a method for secure linkage between databases.

FIG. 5 shows a representation of a method for secure linkage between databases. Broadly, the method includes the generation of encryption keys (502). The encryption key, or a public portion thereof is used to encrypt data (504) that is to be compared for matches in another data set. The encrypted data is compared to a second data set (506) to generate an encrypted indication of matches. The encrypted comparison results are then decrypted to determine matches in the two databases (508).

The key generation (502) may include generating a public/private key pair (510). The public and private keys may be generated at the key holder computing system. The public key may be distributed (512) to one or more parties for use in comparing and linking records in two data sets.

The data encryption (504) receives the public encryption key (514) at the first party's computing device. Records and fields to encrypt are determined (516). The records may include all records in a table or only a subset of records which are desired to be matched. The fields are one or more fields that may be used in uniquely identifying records in the database. The public key is used to encrypt the dataset of determined records and fields (518) and the encrypted dataset transmitted to the second party's computing device for comparison (520).

The public key is received (522) along with the encrypted dataset at the second party's computing device (524). The encrypted dataset is compared to respective matching fields in the second database using the public key (526). The encrypted comparison results are transmitted (528) to the key holder's computing device.

The key holder computing device receives the encrypted comparison results (530) and uses the previously generated private key to decrypt the encrypted comparison results (532). The decrypted comparison results may be used to determine linked record's in the two databases (534). The linked records may then be processed as desired or required (536) by one or more computing systems to share the data provided by the linked records.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-Ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-6 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

What is claimed is:

1. A method for use in secure linkage of databases, the method comprising:
   receiving, by a memory, a public encryption key generated by a key holder in conjunction with a corresponding private key;
   receiving, from a database, an encrypted dataset of one or more fields of one or more records from a first data store, the encrypted dataset encrypted with the public encryption key generated by the key holder, wherein the encrypted dataset of the one or more fields of the one or more records from the first data store is stored as a hash table;
   generating, by a processor, encrypted comparison results between records of the received encrypted dataset and encrypted versions of one or more matching fields of records retrieved from a second data store, the encrypted versions encrypted using the public encryption key; and sending the encrypted comparison results to the key holder of the private key corresponding to the public encryption key for decryption, wherein the encrypted dataset is stored as a plurality of tuples for each record of the encrypted dataset, wherein each tuple is described by $\{ref_i, bucketNo, Cyphertext\}$, where:

$ref_i$ is a reference mapping to a record in the first data store;

bucketNo is a hash bucket number said tuple from the plurality of tuples is stored in; and Cyphertext is one or more encrypted fields, wherein:

the Cyphertext of each tuple is described by $\{E(x_{ik}) | \forall i \in \{1, \ldots, N\}, \forall k \in \{1, \ldots, S\}\}$, wherein:

$E(x_{ik})$ is an encrypted version of plain text value $x_{ik}$ from the first data store;

N is a number of records in the encrypted dataset; and

S is a number of matching fields in each record in the encrypted dataset from the first data store, wherein S=1 and the Cyphertext of each tuple is encrypted from concatenated values from a plurality of fields concatenated into a single matching field.

2. The method of claim 1, wherein the one or more fields of the encrypted dataset correspond to the one or more matching fields.

3. The method of claim 2, wherein the encrypted dataset and the encrypted versions of the retrieved one or more matching fields are encrypted with a probabilistic encryption technique.

4. The method of claim 3, wherein the probabilistic encryption technique is an additive homomorphic encryption technique.

5. The method of claim 1, wherein a Paillier cryptosystem is used.

6. The method of claim 1, wherein the hash table is generated using cuckoo hashing.

7. The method of claim 1, wherein the encrypted comparison results are generated according to:

$$C_{ijk} = (E(X_{ik}) \times E(y_{jk})^{-1})^{r_j};$$

where:

$E(x_{ik})$ is an encrypted version of plain text value $x_{ik}$ from the first data store;

$E(y_{jk})$ is an encrypted version of plain text value $y_{jk}$ from the second data store;

$r_j$ is a random number; and $\forall j \in \{1, \ldots, M\}$, wherein M is a number of records in the second data store.

8. The method of claim 7, wherein the sending the encrypted comparison results comprises sending a plurality of tuples of $\{ref_i, ref_j, c_{ijk}\}$, where:

$ref_j$ is a number mapped to a particular record identifier by the second data store.

9. The method of claim 8, wherein:

a record in the first data store mapped to $ref_i$ is linked to a record in the second data store mapped to $ref_j$ if a decrypted value of $C_{ijk}$ is 0 for one or more values of k.

10. The method of claim 1, further comprising:

generating the public encryption key and corresponding private key at the key holder; and distributing the public encryption key for use in encrypting data from the first data store and the second data store.

11. The method of claim 1, further comprising:

receiving the public encryption key;

determining the one or more fields in the first data store to be encrypted;

retrieving and encrypting the one or more fields of the one or more records from the first data store; and transmitting the encrypted dataset.

12. The method of claim 1, further comprising:

receiving the encrypted comparison results at the key holder;

decrypting the received encrypted comparison results using the private key; and determining linked records between the first and second data store.

13. A device for use in secure linkage of databases, the device comprising:

computer processing unit for executing instructions; and a memory unit storing instructions for execution by the computer processing unit, which when executed configure the device to provide a method comprising:

receiving a public encryption key generated by a key holder in conjunction with a corresponding private key;

receiving an encrypted dataset of one or more fields of one or more records from a first data store, the encrypted dataset encrypted with the public encryption key generated by the key holder, wherein the encrypted dataset of the one or more fields of the one or more records from the first data store are stored as a hash table;

generating encrypted comparison results between records of the received encrypted dataset and encrypted versions of one or more matching fields of records retrieved from a second data store, the encrypted versions encrypted using the public encryption key; and sending the encrypted comparison results to the key holder of the private key corresponding to the public encryption key for decryption, wherein the encrypted dataset is stored as a plurality of tuples for each record of the encrypted dataset, wherein each tuple is described by $\{ref_i, bucketNo, Cyphertext\}$, where:

$ref_i$ is a reference mapping to a record in the first data store;

bucketNo is a hash bucket number said tuple from the plurality of tuples is stored in; and Cyphertext is one or more encrypted fields, wherein the Cyphertext of each tuple is described by $\{E(x_{ik}) | \forall i \in \{1, \ldots, N\}, \forall k \in \{1, \ldots, S\}\}$; where:

$E(x_{ik})$ is an encrypted version of plain text value $x_{ik}$ from the first data store;

N is a number of records in the encrypted dataset; and

S is a number of matching fields in each record in the encrypted dataset from the first data store, wherein S=1 and the Cyphertext of each tuple is encrypted from concatenated values from a plurality of fields concatenated into a single matching field.

14. The device of claim 13, wherein the encrypted comparison results are generated according to:

$$C_{ijk} = (E(x_{ik}) \times E(y_{jk})_{-1})^{r_j};$$

where:
- $E(x_{ik})$ is an encrypted version of plain text value $x_{ik}$ from the first data store;
- $E(y_{jk})$ is an encrypted version of plain text value $y_{jk}$ from the second data store;
- $r_j$ is a random number; and
- $\forall j \in \{1, \ldots, M\}$, wherein M is a number of records in the second data store.

15. The device of claim 14, wherein the sending the encrypted comparison results comprises sending a plurality of tuples of $\{ref_i, ref_j, c_{ijk}\}$,
where:
- $ref_j$ is a number mapped to a particular record identifier by the second data store.

16. The device of claim 15, wherein:
a record in the first data store mapped to $ref_i$ is linked to a record in the second data store mapped to $ref_j$ if a decrypted value of $c_{ijk}$ is 0 for one or more values of k.

* * * * *

UNITED STATES PATENT AND TRADEMARK OFFICE
CERTIFICATE OF CORRECTION

| | | |
|---|---|---|
| PATENT NO. | : 9,503,432 B2 | Page 1 of 2 |
| APPLICATION NO. | : 14/677892 | |
| DATED | : November 22, 2016 | |
| INVENTOR(S) | : El Emam et al. | |

It is certified that error appears in the above-identified patent and that said Letters Patent is hereby corrected as shown below:

On the Title Page

In Item (56), Column 2, under "Other Publications", Line 4, delete ""Information" and insert -- "Information --, therefor.

In the Drawings

Sheet 5 of 5, Fig. 5, reference no. "526", Line 2, delete "data set" and insert -- dataset --, therefor.

In the Specification

In Column 2, Line 8, delete "Pallier" and insert -- Paillier --, therefor.

In Column 2, Line 30, delete "fields n" and insert -- fields in --, therefor.

In Column 3, Line 61, delete "Pallier" and insert -- Paillier --, therefor.

In Column 4, Line 24, delete "device" and insert -- device, --, therefor.

In Column 5, Line 7, delete "stare" and insert -- store --, therefor.

In Column 8, Line 2, delete "FIG. 1," and insert -- FIG. 1. --, therefor.

In Column 10, Line 22, delete "Ciphertext." and insert -- Cyphertext. --, therefor.

In Column 10, Line 24, delete "Ciphertext" and insert -- Cyphertext --, therefor.

In Column 11, Line 38, delete "ciphertext." and insert -- cyphertext. --, therefor.

Signed and Sealed this
Sixth Day of June, 2017

Michelle K. Lee
*Director of the United States Patent and Trademark Office*

CERTIFICATE OF CORRECTION (continued)

In Column 11, Line 47, delete "ciphertexts." and insert -- cyphertexts. --, therefor.

In Column 11, Lines 52-53, delete "technique;" and insert -- technique, --, therefor.

In Column 11, Line 61, after "i, j" insert -- , --.

In Column 12, Line 2, delete "far" and insert -- for --, therefor.

In Column 13, Line 5, delete "mod an)" and insert -- mod αn) --, therefor.

In Column 13, Line 27, delete "Pallier" and insert -- Paillier --, therefor.

In Column 13, Line 31, after "follows" insert -- : --.

In Column 13, Line 43, delete "y>," and insert -- y>. --, therefor.

In Column 13, Line 57, delete "2," and insert -- 2. --, therefor.

In Column 14, Lines 25-26, delete "meta data" and insert -- metadata --, therefor.

In the Claims

In Column 17, in Claim 7, Line 45, delete "$C_{ijk}=(E(X_{ik})$" and insert -- $c_{ijk}=(E(x_{ik})$ --, therefor.

In Column 17, in Claim 9, Line 63, delete "$C_{ijk}$" and insert -- $c_{ijk}$ --, therefor.

In Column 18, in Claim 13, Line 21, delete "computer" and insert -- a computer --, therefor.

In Column 18, in Claim 14, Line 67, delete "$C_{ijk}=(E(x_{ik}) \times E(y_{jk})-1)^{rj}$" and insert -- $c_{ijk}=(E(x_{ik}) \times E(y_{jk})-1)^{rj}$ --, therefor.

In Column 19, in Claim 15, Line 13, delete "$ref_i$" and insert -- $ref_j$ --, therefor.